United States Patent [19]

Riggs

[11] 3,808,491

[45] Apr. 30, 1974

[54] SHADED POLE SYNCHRONOUS MOTOR

[75] Inventor: William D. Riggs, Southington, Conn.

[73] Assignee: North American Philips Corporation, New York, N.Y.

[22] Filed: Nov. 15, 1972

[21] Appl. No.: 306,626

[52] U.S. Cl.............. 310/162, 310/164, 310/172
[51] Int. Cl. ............................................. H02k 19/14
[58] Field of Search.............. 310/41, 172, 162–164, 310/156

[56] References Cited
UNITED STATES PATENTS

| 1,977,184 | 10/1934 | Haydon | 310/164 |
| 2,382,333 | 8/1945 | Poole | 310/164 |
| 2,437,142 | 3/1948 | Welch et al. | 310/164 |
| 2,951,957 | 9/1960 | Eigeman | 310/164 |
| 2,981,855 | 4/1961 | VanLieshout et al. | 310/162 X |
| 3,014,141 | 12/1961 | Riggs | 310/164 X |
| 3,502,921 | 3/1970 | Suzuki et al. | 310/172 |
| 3,555,323 | 1/1971 | Gerber | 310/162 |
| 3,737,695 | 6/1973 | Kilmer | 310/164 |

FOREIGN PATENTS OR APPLICATIONS

| 876,576 | 9/1961 | Great Britain | 310/164 |

Primary Examiner—D. F. Duggan
Attorney, Agent, or Firm—Frank R. Trifari

[57] ABSTRACT

A shaded pole unidirectional synchronous motor employs an odd number of shaded stator poles and odd number of non-shaded stator poles. The number of shaded poles exceed the number of non-shaded poles and the shaded and non-shaded poles are arranged in groups, the separation between groups differing by 540+α or 540—α electrical degrees, where α is the shading angle. The stator poles extend from an upper cover and lower mounting plate to form a cylindrical cage and are designed to function with an A.C. excited toroidal coil outside the cage and a ferrite rotor with induced poles thereon, rotatably mounted within the cage formed by the stator poles.

7 Claims, 4 Drawing Figures

PATENTED APR 30 1974

SHADED POLE SYNCHRONOUS MOTOR

The present invention relates to synchronous electric motors and, more particularly, to such motors with self-starting and unidirectional characteristics employing shaded poles.

While shaded pole synchronous motors have long been known in the motor art and unidirectional shaded pole constructions have been disclosed in detail as early as U.S. Pat. No. 2,437,142 to Welsh et al., there still exists a need for an efficient, low cost, simply designed motor which offers relatively high starting torque of a substantially constant value with a minimum of reverse torque characteristics.

An important feature of my invention is a novel stator construction which employs a unique relationship between the shaded and non-shaded poles to effect the desired minimum reverse torque characteristics. Other aspects of my invention include the novel housing employing a simplified magnetic circuit and the use of aluminum shading rings and extruded bearing housing.

A primary object of the present invention therefore is the provision of a shaded pole synchronous motor designed for minimum reverse torque characteristics. This feature is achieved by the use of an optimum ratio of shaded poles to non-shaded poles and by the employment of a novel electrical orientation of these poles.

Another object of the present invention is a reduction in the number of parts used in the motor, thereby providing a motor which is economical to manufacture and simple to assemble.

Other objects of the present invention will become apparent by reference to the following description and drawings while the scope of the invention will be pointed out in the appended claims.

In accordance with the present invention a self-starting single phase synchronous motor includes a first ferromagnetically soft end member and a first even-number set of ferromagnetically soft stator poles extending from the first end member in one direction, the poles being arranged around the circumference of a circle. Also included is a first shading ring having a diameter larger than the diameter of the circle and adapted to interfit with the poles, the shading ring having holes and open slots, an odd number of poles extending through the holes forming shaded poles, and an odd number of poles extending through the slots forming non-shaded poles, the shaded and non-shaded poles being arranged in alternating groups. A second ferromagnetically soft end member and second even-numbered set of ferromagnetically soft stator poles are also included, the holes extending from the second end member in a direction opposite to the poles of the first member, the second set of poles being arranged around the circumference of a circle, the second set of poles extending between and interspaced with the first set of poles so as to form a cylindrical cage having a diameter equal to that of either of the circles. The motor also comprises a second shading ring, having a diameter larger than the diameter of the cylinder and adapted to interfit with the second set of poles, the second shading ring having holes and open slots, an even number of poles extending through the holes forming shading poles, and an even number of poles extending through the slots forming non-shaded poles, the shaded and non-shaded poles being arranged in alternating groups.

The motor also includes a toroidal coil surrounding the cylindrical cage formed by the first and second set of poles, the coil adapted to being connected to a source of alternating current and a cylindrical non-salient pole rotor having a number of induced poles around its circumference, the induced poles alternating north and south around the rotor, the rotor being disposed and rotatable within the cylinder formed by the stator poles.

A preferred embodiment of the invention requires that the electrical angular relationship between each group of shaded poles is separated from each group of non-shaded poles in each set by an angle of 540−α electrical degrees on one side and 540+α electrical degrees on the other, where α is the delay in buildup of the flux of the shaded poles relative to the non-shaded poles.

Figure 1:
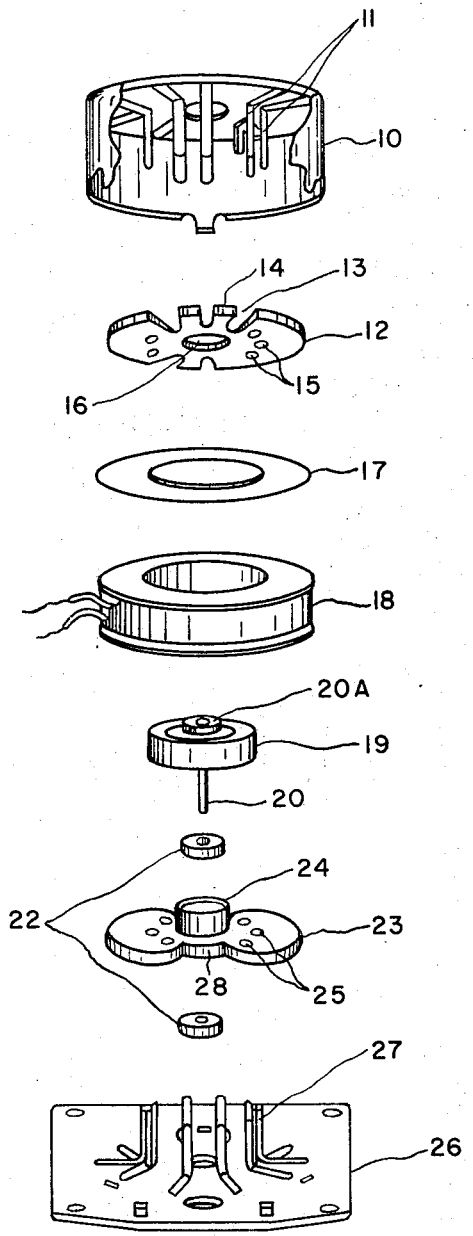
FIG. 1 is an exploded view in perspective showing in detail the various parts of a synchronous motor and illustrating the relative positions of the parts prior to assembly.
Figure 2:
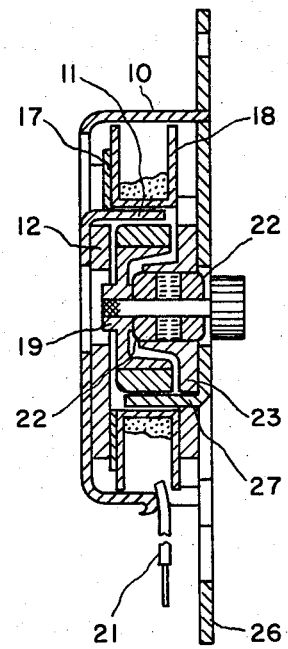
FIG. 2 is a view of the motor taken in side elevation section of the motor of FIG. 1 after assembly.

Referring initially to FIG. 1 and 2, the major elements of the self-starting single phase synchronous motor constructed according to the teachings of the present invention will be described. The motor includes a first ferromagnetically soft end member shown in the figures as ferrous cover 10. The cover 10 has a first set of ferromagnetically soft stator poles extending from the cover in one direction, the poles being arranged around the circumference of a circle, which arrangement will be described more completely with respect to FIGS. 3 and 4. The poles are shown as 11 in the figures. A first shading ring illustrated as upper ring 12 is approximately circular in shape and has a diameter somewhat larger than the diameter of the circle described by the stator poles 11. The upper shading ring 12 also includes holes 15 which are arranged to receive and interfit with the shaded poles of stator poles 11. The ring 12 also includes slots 13 which are formed between projections 14 in the shading ring. The open slots 13 are designed to receive non-shaded poles of stator poles 11. Generally, the upper shading ring 12 is designed so that the holes 15 encompass an odd number of shaded poles and the slots 13, an odd number of non-shaded poles. It can be seen from the figures that the groups of shaded and non-shaded poles alternate. The upper shading ring also includes a central hole 16 for allowing a projection of the rotor to extend therethrough. The upper shading ring 12 is thus able to fit over appropriate poles of the ferrous cover 10 and can be seen in FIG. 2 to fit snugly against the inside surface of the ferrous cover. Continuing from top to bottom in FIG. 1, below the upper shading ring is an aluminum washer 17, the primary purpose of which is to maintain the parts in tight assembly in the final unit. While any standard manufacturing technique would be suitable for producing the aluminum washer, it has been found that an aluminum wave technique is most suitable.

The aluminum washer is seen to have a central opening larger than that of the circle of the poles and surrounds the poles in assembly. The washer is approximately comparable in size to the next element, the toroidal coil 18, which is adapted to surround the poles which descend from the cover 10 (and ascend from the mounting as will later be described) to within the central portion of the bobbin wound toroidal coil 18. The coil 18 is adapted to being connected to a source of alternating current by means of lead-in conductors 21. The coil has an internal diameter which again is larger than the circles described by the poles.

Below the coil and adapted to fit within the coil is the cylindrical non-salient pole rotor shown as element 19. The rotor is preferably made of a ferrite material and has a number of poles induced around its circumference. In general, the angular spacing of the rotor poles is the same as the angular spacing of the stator poles within a grouping. In one example of the motor of the present invention, the rotor employed 24 poles although a lesser number may be used provided the angular spacing is maintained. The rotor assembly includes a rotor shaft 20 and a rotor hub 20a to enable the rotor to be disposed within the poles and coil 18. The induced poles around rotor 19 alternate north and south around the circumference of the rotor.

A lower shading ring 23 is mounted below the rotor assembly 19 and between the rotor assembly 19 and a ferrous mounting 26. The lower shading ring includes a housing 24 adapted to receive a pair of small cylindrical bearings on opposite sides of the housing. The bearings have centered holes for receipt of the rotor shaft 20. The second or lower shading ring 23 has an outer diameter larger than the diameter of a circle formed by poles 27 projecting from the ferrous mounting 26. The ferrous mounting 26 functions as the second ferromagnetically soft end member and includes a second even-numbered set of ferromagnetically soft stator poles which extend from the ferrous mounting in a direction opposite to the poles 11 of the cover 10. The second set of poles 27 is also arranged around the circumference of the circle of approximate size to that of the circle in the first end member. The second set of poles 27 extend between and are interspaced with the first set 11 to form a cylindrical cage which has a diameter approximately that of either of the circles in the cover 10 or mounting 26. The lower or second shading ring 23 has an outer diameter larger than that of the cylinder and is adapted to interfit with the second set of poles 27. The lower shading ring 23 has holes 25 and open slots 28. The compactness of the assembly can be readily apparent by reference to FIG. 2.

It will be seen that the lower shading ring 23 has an even number of poles extending through the holes forming shading poles and an even number of poles extending through the slots forming the non-shaded poles, the shaded and non-shaded poles being arranged in alternating groups.

Figure 3:
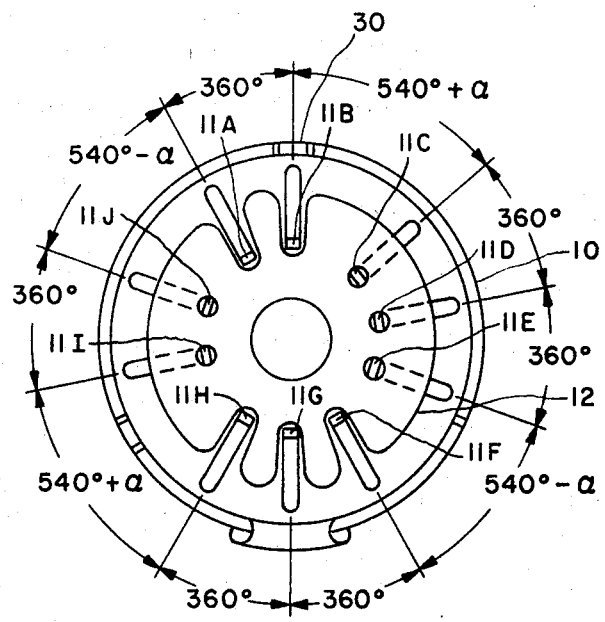
FIG. 3 is a plan view of the inside of the ferrous cover with the shading ring in place showing the electrical angular arrangement of the poles.
Figure 4:
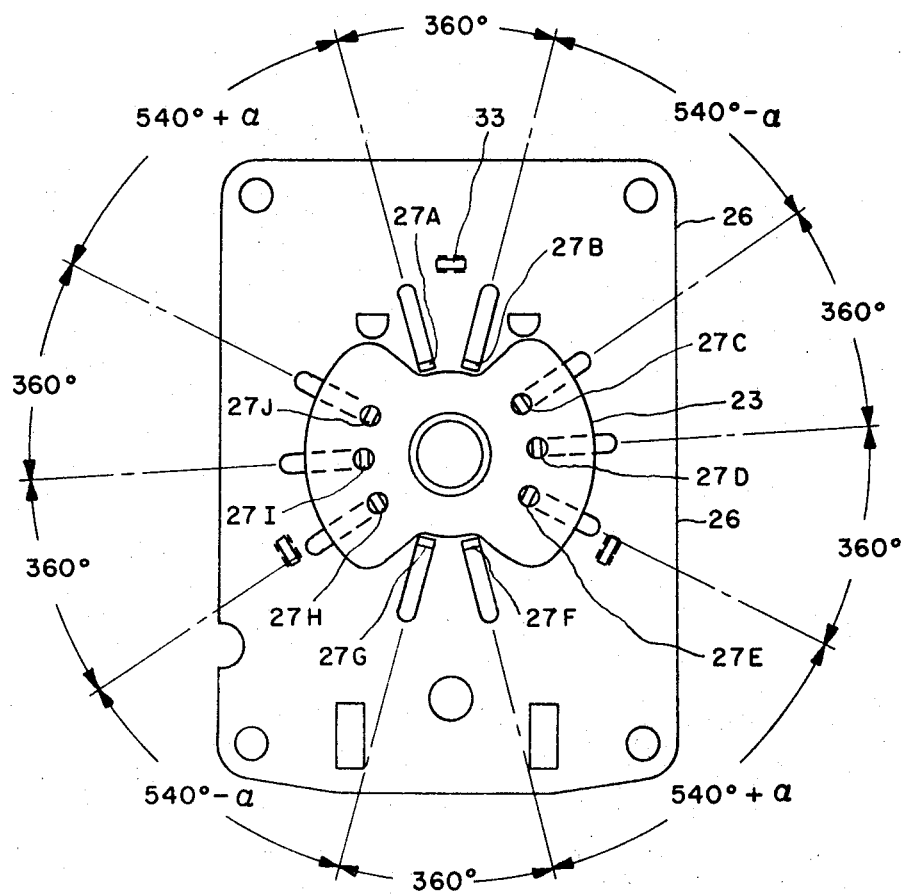
FIG. 4 is a plan view of the inside of the ferrous mounting plate with the lower shading ring in place.

A preferred arrangement of the shaded and non-shaded pole structure will be described with respect to FIGS. 3 and 4. FIG. 3 illustrates the end view of the ferrous cover 10 showing the groups of shaded and non-shaded poles extending through the upper shading ring 12. The individual poles have been labelled 11A through 11J for the purpose of convenience viewing the figure in a clockwise direction. It can be seen that the groups of non-shaded poles are diametrically opposite. That is, the non-shaded poles 11A and 11B are diametrically opposite to non-shaded poles 11F, 11G and 11H. Similarly, the shaded poles are diametrically opposite, that is, the shaded poles 11I and 11J are opposite to shaded poles 11C, 11D, and 11E. In the preferred arrangement, the individual poles within any of the groups are spaced apart by 360° in electrical degrees. For example, within the non-shaded group consisting of poles 11A and 11B, these poles are separated by 360°.

Between the groups, the end poles are separated from the adjacent end poles of the next group by either $540+\alpha$ electrical degrees or $540-\alpha$ electrical degrees. For example, the electrical separation between non-shaded pole 11B and shaded pole 11C is $540°+\alpha$ in the preferred embodiment. Alpha ($\alpha$) represents the delay in build-up in the flux of the shaded poles relative to the non-shaded poles. Between the end pole of the shaded group including 11E and the non-shaded pole 11F is a total of 540 $\alpha+$ electrical degrees and finally between the shaded group including 11J and the non-shaded group of 11A there exists $540-\alpha$ electrical degrees.

Referring now to the ferrous mounting 26 and the poles thereof extending through lower shading ring 23, the preferred arrangement of shaded and non-shaded poles will be described. In this arrangement, the poles 27 have been specifically identified as 27A – J when viewed clock-wise in FIG. 4. Again the non-shaded poles are diametrically opposed as shown by poles 27A and B and poles 27G and F. Similarly, the shaded poles 27H, I, and J are diametrically opposite poles 27C, D, and E. Here the shaded and non-shaded poles are even numbered. Again, all of the poles within a group are separated by 360 electrical degrees and the separation between groups of poles is either $540° - \alpha$ or $540° + \alpha$. In the assembly of the ferrous cover 10 and ferrous mounting 26, the ferrous cover has three tabs which insert in appropriate slots in the ferrous mounting. In particular, the tab 30 in the cover 10 lines up with slot 33 in the mounting 26 and the general interspacing of the poles extending from cover 10 can be understood by virtue of this reference point.

The emphasis of the synchronous electrical motor in accordance with the present invention is primarily on attaining and maximizing the self-starting and unidirectional operational characteristics of the motor. However, a strong secondary emphasis has been placed on simplicity in design and the use of low cost, non-critical materials. Accordingly, only two ferromagnetic plates comprise the electromagnetic circuit. The ferrous mounting plate 26 is seen to be a rectangular plate which also may be used to support components of an assembly with which the motor is adapted to cooperate. In one application this assembly included the necessary parts for a timing mechanism. The ferromagnetic cover 10 encloses the components and in addition completes the magnetic return path of the motor.

The shading rings, both upper and lower, are constructed of aluminum rather than the more conventional copper. A significant feature is that the bearing housing of the lower shading is extruded with the ring and is integral with the ring so as to eliminate unnecessary parts. In addition, the washer as stated above is preferably aluminum. The use of aluminum also enables the motor to be somewhat lighter than with copper.

In the preferred arrangement of poles, an unusual aspect of the design is that there are no even pairs of poles. Specifically, there are a total of 11 shaded poles and 9 non-shaded poles in a preferred embodiment of the present invention. It was discovered and found that this particular combination provided an optimum arrangement in order to reduce reverse directional components.

In a preferred embodiment, the shading angle was chosen to be 37.6° (indicated by alpha ($\alpha$) throughout the specification). The motor according to the present invention is by no means limited to this angle, however, practical limitations restrict the range to between 30° and 45°. The limitations are based on the fact that at the lower angle, forward torque is sacrificed and at the larger angle, the bulk of the shading material becomes impractical, particularly if aluminum is employed, which has a resistivity of about 70 percent greater than that of copper.

The motor according to the present invention has application for many and various arrangements where a synchronous motor is required, however, it is particularly advantageous in devices requiring motors of low cost, high efficiency, high compactness and having a minimum of reverse torque characteristics.

While the invention has been described and illustrated with respect to preferred embodiments which provides satisfactory results, it should be understood by those skilled in the art that various changes and modifications may be made therein without departing from the true spirit and scope of the present invention.

What is claimed is:

1. A self-starting single phase synchronous motor comprising:
   a first ferromagnetically soft end member;
   a first set of ferro magnetically soft stator poles extending from said first end member in one direction, said poles being arranged around the circumference of a circle;
   a first shading ring having a diameter larger than said diameter of said circle and adapted to interfit with said poles, said shading ring having holes and open slots, a number of poles extending through said holes forming shaded poles, and a number of poles extending through said slots forming non-shaded poles, the shaded and non-shaded poles being arranged in alternating groups, each group of non-shaded poles being separated from each group of shaded poles by an electrical angle of 540°−$\alpha$ on one side and 540°+$\alpha$ on the other side where $\alpha$ is the delay in build-up of flux of the shaded poles relative to the non-shaded poles;
   a second ferromagnetically soft end member;
   a second set of ferromagnetically soft stator poles extending from said second end member in a direction opposite to said poles of said first member, said second set of poles extending between and interspaced with said first set of poles so as to form a cylindrical cage having a diameter equal to that of either of said circles;
   a second shading ring, having a diameter larger than the diameter of said cylinder and adapted to interfit with said second set of poles, said second shading ring having holes and open slots, a number of poles extending through said holes forming shading poles, a number of poles extending through said slots forming non-shaded poles, the shaded and non-shaded poles being arranged in alternating groups, each group of non-shaded poles being separated from each group of shaded poles by an electrical angle of 540°−$\alpha$ on one side and 540°+$\alpha$ on the other side where $\alpha$ is the delay in build-up of flux of the shaded poles relative to the non-shaded poles;
   wherein the poles within each group are separated by an electrical angle of 360° and wherein there are two groups of shaded poles and two groups of non-shaded poles in each of the first and second set and wherein the first set includes a first group of non-shaded poles consisting of two poles, a second group of shaded poles consisting of three poles, said second group separated from said first group by 540 +$\alpha$ electrical degrees, a third group of non-shaded poles consisting of three poles, said third group separated from said second group by 540 −$\alpha$ electrical degrees, and a fourth group of shaded poles consisting of two poles, said fourth group separated from said third group by 540 +$\alpha$ electrical degrees and said first group by 540 −$\alpha$ electrical degrees.

2. The motor of claim 1 wherein the shading rings consist of aluminum.

3. The motor of claim 2 wherein the rotor includes a shaft which extends through the second shading ring and said second shading ring includes a hollow portion for retaining at least one bearing for supporting the rotor shaft.

4. The motor of claim 1 wherein the second set includes a first group of non-shaded poles consisting of two poles, a second group of shaded poles consisting of three poles, the poles of said second group being separated from the poles of said first group by 540 −$\alpha$ electrical degrees, a third group of non-shaded poles consisting of two poles, said third group separated from said second group by 540 +$\alpha$ electrical degrees, and a fourth group of shaded poles consisting of three poles, said fourth group being separated from said third group by 540 −$\alpha$ electrical degrees and from said first group by 540 +$\alpha$ electrical degrees.

5. A self-starting single phase synchronous motor comprising
   a first ferromagnetically soft end member;
   a first even-numbered set of ferromagnetically soft stator poles extending from said first end member in one direction, said poles being arranged around the circumference of a circle;
   a first shading ring having a diameter larger than said diameter of said circle and adapted to interfit with said poles, said shading ring having holes and open slots, an odd number of poles extending through said holes forming shaded poles, and an odd number of poles extending through said slots forming non-shaded poles, the shaded and non-shaded poles being arranged in alternating groups;
   a second ferromagnetically soft end member;
   a second even-numbered set of ferromagnetically soft stator poles extending from said second end member in a direction opposite to said poles of said first member, said second set of poles being arranged around the circumference of a circle, said second set of poles extending between and interspaced with said first set of poles so as to form a cylindrical cage having a diameter equal to that of either of said circles;

a second shading ring, having a diameter larger than the diameter of said cylinder and adapted to interfit with said second set of poles, said second shading ring having holes and open slots, an even number of poles extending through said holes forming shading poles, an even number of poles extending through said slots forming non-shaded poles, the shaded and non-shaded poles being arranged in alternating groups;

a toroidal coil surrounding said cylinder formed by said first and second set of poles, said coil adapted to being connected to a source of alternating current;

and a cylindrical non-salient pole rotor having a number of poles induced around its circumference, the induced poles alternating north and south around the rotor, said rotor being disposed and rotatable within the cylinder formed by the stator poles.

6. The motor of claim 5 wherein the total number of shaded poles in the first and second set exceed the total number of non-shaded poles in the first and second set.

7. The motor of claim 5 wherein the total number of shaded poles in the first and second set exceed by two the total number of non-shaded poles in the first and second set.

* * * * *